United States Patent [19]
Alexander et al.

[11] 3,708,512
[45] Jan. 2, 1973

[54] SEPARATION OF WAX AND OIL BY FRACTIONAL CRYSTALLIZATION

[75] Inventors: David George Alexander, Westella, Kirkella; Anthony Michael Lloyd, Walkington, near Beverley, East Yorkshire; Geoffrey Charles Greensides, North Ferriby, Yorkshire; David Harry Thompson, Thorngumbald, near Hedon, Yorkshire, all of England

[73] Assignee: Rose, Down & Thompson Limited, Kingston-upon-Hull, Yorkshire, England

[22] Filed: Sept. 25, 1969

[21] Appl. No.: 861,073

[52] U.S. Cl. .............................. 260/412.8, 260/428.5
[51] Int. Cl. ............................................... C11b 1/10
[58] Field of Search ..................... 260/412.8, 428.5

[56] References Cited

UNITED STATES PATENTS

| | | | |
|---|---|---|---|
| 2,735,780 | 2/1956 | Le Compte et al. | 260/412.8 |
| 2,744,125 | 5/1956 | Meeks et al. | 260/412.8 |
| 2,910,363 | 10/1959 | Rubin et al. | 260/428.5 |
| 3,235,578 | 2/1966 | Zilch et al. | 260/428.5 |

Primary Examiner—Lewis Gotts
Assistant Examiner—Johnnie R. Brown
Attorney—Holcombe, Wetherill & Brisebois

[57] ABSTRACT

A selective crystallization process in which a mixture of components is dissolved in a solvent and the solution is cooled uniformly by passing through it a coolant with which the solvent is immiscible or only partially miscible. The coolant temperature is such that the desired higher melting point fraction of the mixture crystallizes out and is removed from the solution.

12 Claims, 1 Drawing Figure

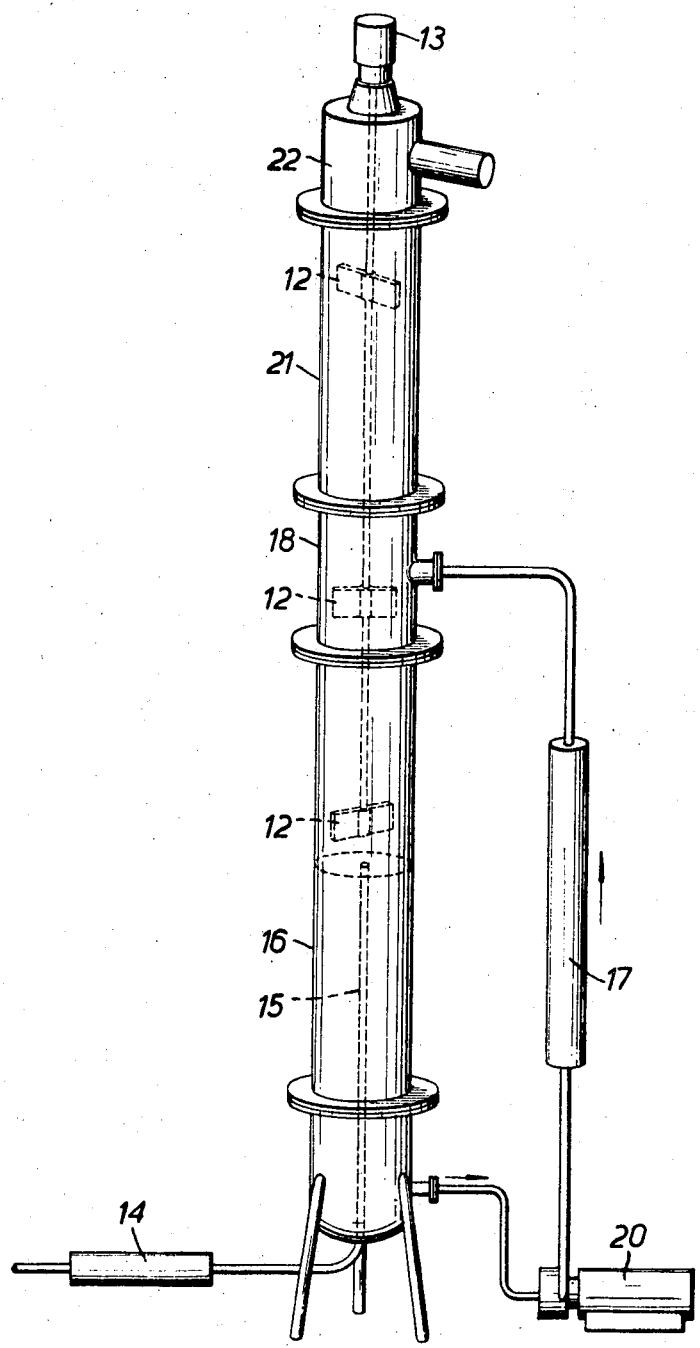
Inventors
D. G. ALEXANDER
A. M. LLOYD
G. C. GREENSIDES
BY D. H. THOMPSON
Holcombe, Wetherill & Brisebois
ATTORNEYS

SEPARATION OF WAX AND OIL BY FRACTIONAL CRYSTALLIZATION

This invention relates to the separation by selective crystallization of one component or group of components from a mixture of components, such as the removal of the waxes from animal or vegetable oils, e.g., tallows and rice bran oil. The separation by selective crystallization has been difficult to achieve on a commercial scale.

In accordance with the present invention, a fractional crystallization process for removing an included organic or group of organic components from an extract from animal and/or vegetable raw material comprises mixing with the extract an organic solvent therefor, the temperature of the mixture being sufficiently high to cause the formation of a solution of the extract in the solvent, passing through the solution a liquid at a lower temperature to cool the solution and thereby to cause crystallization of the component having the higher or highest temperature of crystallization or the group of components having the higher or highest range of temperatures of crystallization, removing the crystallized component or components, recovering the cooling liquid, which is immiscible or only partially miscible with the solution, and, after cooling, recirculating the liquid. Subsequently the other component or components may be separated from the solvent; where there are more than two components or groups of components, a second component or group of components may be separated by a second crystallization stage.

The cooled liquid is preferably water which is continuously circulated through the solution and which is continuously cooled. In that case, the solvent is one in which the components dissolved and with which water is immiscible or mixes to a limited extent. An example of such a solvent is methyl ethyl ketone.

The invention is applicable to the separation of a higher melting point fraction of a mixture of components from a lower melting point fraction; in this case the temperature of the solution is lowered to a value closely below the lower temperature of crystallization of the components of the higher melting point fraction.

The invention will be more readily understood by way of example from the following description of a selective crystallization process in accordance therewith and from the following description of one form of apparatus, for performing the process on a continuous basis, reference being made to the accompanying drawing which illustrates the apparatus.

In the selective crystallization process, the mixture or organic components extracted from animal and/or vegetable matter, for example refined and deodorised palm oil is mixed with a solvent, such as methyl ethyl ketone or hexane, in which the components are soluble. The resulting mixture is heated to a temperature that is sufficiently high to cause the formation of a solution and that solution is passed into a process vessel where it is continuously but mildly agitated.

The solution is cooled by circulating water through the solution in the vessel, the water being sprayed in to the solution at the top of the vessel and, after passing through the solution, forming a pool at the bottom by virtue of its relatively high specific gravity. From the bottom of the vessel, the water containing a minor amount of the solvent is removed and pumped through refrigeration coils back to the top of the vessel.

The circulation of the cooled water through and in contact with the solution cools the vessel contents down to a temperature which is accurately determined by the cooling effected by the cooling coils. The distribution of the cooled water over the cross-section of the vessel ensures that the cooling is uniform. The temperature of the water is selected to cool the extract and solvent down to a temperature closely below the crystallization temperature of the component or group of components to be removed. Accordingly, the selected component or group of components are almost entirely crystallized and are separated from the liquid phase in any known manner.

If the original solution contains three or more components or groups of components additional to the solvent, the solution after crystallization and removal of the first component or group, may be cooled further to crystallize out the component or group with the second highest crystallization temperature, and the selective crystallization continued in stages in this way until only the solvent and one component or group of components remains. The final component or group may be recovered by evaporation of the solvent or by other separation methods applicable to the materials involved.

Methyl ethyl ketone is slightly soluble in water and the circulated cooling water is therefore a solution of the solvent in water. The cooling liquid has four functions. It acts to cool the solution of the components in the solvent by direct contact, thereby achieving more uniform cooling than if the vessel itself were to be cooled and obviating build up of solids on the vessel walls. Secondly, the presence of the water serves to keep the solution of the components in the solvent saturated with water. This keeps the crystallization temperature of the component or components to be separated at a constant maximum value which minimises the load on the refrigeration system and makes it possible to remove selectively and predictably the higher melting components from the mixture by cooling the mixture to the appropriate temperature.

Thirdly, the freezing point of the water containing dissolved solvent is substantially lower than that of pure water, thus enabling the refrigerating system to be operated at a temperature lower than the normal freezing point of water and allowing more rapid cooling of the oil solution to temperatures near the freezing point of pure water.

Fourthly, because the water, or water containing solvent is a very poor solvent for the extract, the extract is not carried into the refrigerated heat exchanger in such quantities as to cause deposition there resulting in rapid loss of cooling efficiency and eventual blocking of the heat exchanger.

EXAMPLE

One part by weight of refined and deodorized palm oil was mixed with two parts of methyl ethyl ketone and the mixture heated to form a solution which was treated as described above, the temperature of the circulated water being controlled to bring the temperature of the solution to 14°C. The crystallized high melting point fraction of the palm oil was separated by filtration and the remaining liquid low melting point fraction recovered by evaporation. Both fractions were desolventized and dried by heating to 100°C under vacuum. On analysis the original oil and the two fractions had the following characteristics:

|  | Weight as percentage of original oil | Cloud Point | Slip Point | Iodine value |
|---|---|---|---|---|
| Original Oil | 100 | 26°C | 38.4°C | 52.4 |
| High melting point fraction | 23 |  | 53.2°C | 35.4 |
| Low melting point fraction | 77 | 14°C |  |  |

The procedure was repeated using hexane as the solvent and giving the following results:

|  | Weight as percentage of original oil | Cloud Point | Slip Point | Iodine value |
|---|---|---|---|---|
| Original oil | 100 | 26°C | 38.4°C | 52.4 |
| High melting point fraction | 12 |  | 56.5 | 26.9 |
| Low melting point fraction | 88 | 19°C |  |  |

Apparatus for effecting selective crystallization continuously is shown in the drawing and consists of a vertical column separated into a number of sections and having an agitator 12 driven by a variable speed agitator motor 13.

The mixture of components to be separated and the solvent-water-saturated methyl ethyl ketone or hexane — is passed through a heater 14 which raises the temperature to a value to give a complete solution. From the heater 14, the solution passes through a central pipe 15 to the lowermost section 16 of the column; as will be observed, the pipe 15 terminates part-way up the first section. A chilled solution of methyl ethyl ketone in water is continuously supplied from a cooler 17 to the second section 18 of the column, where it is sprayed into the column and descends as droplets, counter-current to the solution rising up the column. The water is removed at the bottom of the column and is forced by a pump 20 to the entry of the cooler 17.

A third section 21 of the column is provided as a de-entraining zone and is surmounted by a discharge section 22 from which the solution and crystallized material are continuously removed for subsequent separation in a filter, centrifuge, or the like.

Crystallization of the higher fraction occurs in section 16 and the crystallized material, with entrained solution and water, pass upwardly into the de-entraining section 21. During the passage through section 21, and under the action of the mild agitation of the agitator 12, any agglomeration formation of the crystals is broken up, permitting the heavier component — the water — to become de-entrained and to descend to the bottom of the column for removal. Similarly, any crystals entrained with the water in section 16 are de-entrained in that portion of the section around the pipe 15 and are permitted to rise through the column for eventual removal.

What is claimed is:

1. A fractional crystallization process for removing an organic wax or oil component or group of such organic components obtained from an extract from animal or vegetable raw material, comprising mixing with the extract an organic solvent therefor, the temperature of the mixture being sufficiently high to cause the formation of a solution of the extract in the solvent, then passing through the solution a cooling liquid at a lower temperature to cool the solution and thereby to cause crystallization of the component having the higher or highest temperature of crystallization or the group of components having the higher or highest range of temperatures of crystallization, removing the crystallized component or components, recovering the cooling liquid which is immiscible or only partly miscible with the solution, and, after cooling, recirculating the cooling liquid through the solution.

2. A process according to claim 1 in which the extract has at least three components or groups of components, and, after crystallization of the component or group having the highest temperature or range of temperatures of crystallization, the temperature of the solution is lowered to cause crystallization of the component or group having the next highest temperature of crystallization.

3. A process according to claim 1 in which after removal of the crystallized component or components, the solvent is recovered from the remaining solution.

4. A process of claim 1 in which the cooling liquid is water, the solvent selected being at most partially miscible therewith.

5. A process of claim 1 in which the solution is passed continuously through a vessel, counter-current to the movement of the cooling liquid.

6. A process of claim 1 in which the solvent is methyl ethyl ketone.

7. A process of claim 1 in which the extract is palm oil.

8. A process for separating a group of higher melting point organic wax or oil components from an extract of animal or vegetable origin comprising adding to the extract, and dissolving the extract in, an organic solvent containing dissolved water, the solvent being only partially miscible with water, passing a solution of the solvent in water through the extract solution to saturate the solvent with water and to cool the solution to a temperature closely below the lowest temperature of crystallization of the group to be separated, and thereby crystallizing that group, removing the crystallized components, and recovering the solvent.

9. A separating process according to claim 8 in which the solvent is methyl ethyl ketone.

10. A selective crystallization process comprising the steps of (a) forming a solution by dissolving a mixture of organic wax or oil components extracted from animal or vegetable material in an organic solvent and (b) selectively crystallizing a desired component having a higher temperature of crystallization than other components in said solution by directly contacting the resulting solution with a liquid coolant that has been cooled to a temperature below the temperature of crystallization of the component that is to be crystallized but above the temperature that is required to crystallize the other components that are to remain in solution.

11. The process of claim 10 in which said liquid coolant is immiscible or only partially miscible with said solvent.

12. The process of claim 10 in which after removing said crystallized component said other components are selectively crystallized by directly contacting said solution with coolant at progressively lower temperatures that will selectively crystallize said other components one at a time.

* * * * *